(12) United States Patent
Mosko et al.

(10) Patent No.: US 7,567,547 B2
(45) Date of Patent: Jul. 28, 2009

(54) METHOD AND SYSTEM FOR LOOP-FREE AD-HOC ROUTING

(75) Inventors: Marc E. Mosko, Santa Cruz, CA (US); Jose J. Garcia-Luna-Aceves, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 567 days.

(21) Appl. No.: 11/517,203

(22) Filed: Sep. 7, 2006

(65) Prior Publication Data

US 2008/0062916 A1 Mar. 13, 2008

(51) Int. Cl.
*H04L 12/28* (2006.01)
(52) U.S. Cl. .................................. 370/351; 370/231
(58) Field of Classification Search ................ 370/229, 370/230, 230.1, 235, 236, 351
See application file for complete search history.

(56) References Cited

U.S. PATENT DOCUMENTS

| | | | |
|---|---|---|---|
| 6,791,949 | B1 | 9/2004 | Ryu et al. |
| 2002/0101869 | A1* | 8/2002 | Garcia-Luna-Aceves et al. . 370/389 |
| 2003/0033394 | A1 | 2/2003 | Stine |
| 2004/0233847 | A1* | 11/2004 | Park et al. .................... 370/235 |
| 2004/0252643 | A1* | 12/2004 | Joshi ............................ 370/238 |
| 2005/0157698 | A1* | 7/2005 | Park et al. .................... 370/351 |

FOREIGN PATENT DOCUMENTS

WO 0221770 A2 3/2002

OTHER PUBLICATIONS

Publication: "Efficient Use of Route Requests for Loop-Free On-demand Routing in Ad Hoc Networks", by Rangarajan et al., R. Boutaba et al. (Eds.): Networking 2005, LNCS 3462, pp. 1096-1107, 2005, IFIP International Federation for Information Processing 2005.
Publication: "On-demand Loop-Free Routing in Ad Hoc Networks Using Source Sequence Numbers", [online] by Rangarajan et al., Mobile Adhoc and Sensor Systems Conference, 2005, IEEE International Conference, Nov. 7-10, 2005 [retrieved on Aug. 31, 2006], ISBN: 0-7803-9465-8, Retrieved from http://ieeexplore.ieee.org/xpl/absprintf.jsp?arnumber=1542859.

* cited by examiner

*Primary Examiner*—Kwang B Yao
*Assistant Examiner*—Andrew Lai
(74) *Attorney, Agent, or Firm*—Park, Vaughan & Fleming LLP; Shun Yao

(57) ABSTRACT

One embodiment of the present invention provides a system that facilitates loop-free ad-hoc routing in a wireless network. During operation, the system advertises a local sequence number associated with a local node for a destination node, and receives a first route request at the local node, wherein the route request specifies a source node, the destination node, and a first sequence number. The system further selectively maintains a record, which indicates the source node, the destination node, the first sequence number, and a node from which the route request is received. The system also selectively forwards a second route request based on the received route request, wherein the second route request specifies the source node, the destination node, and a second sequence number which is less than the first sequence number and less than or equal to the advertised local sequence number.

25 Claims, 11 Drawing Sheets

METHOD AND SYSTEM FOR LOOP-FREE AD-HOC ROUTING

BACKGROUND

1. Field of the Invention

The present invention relates to the design of wireless networks. More specifically, the present invention relates to a method and a system for facilitating loop-free ad-hoc routing in a wireless network.

2. Related Art

Recent developments in mobile computing devices and wireless network technology have led to the recent development of wireless ad-hoc networks. In a wireless ad-hoc network, each node can be mobile and has at least one radio interface. Moreover, wireless ad-hoc networks typically do not have central network infrastructure, such as cell towers and base stations as access points. This is a significant advantage at locations where fixed infrastructure is unavailable. Exemplary applications of wireless ad-hoc networks include tactical military applications and commercial vehicle-to-vehicle systems.

Routing poses a challenge in a wireless ad-hoc network, because the network topology can change. Typically, data packets are forwarded from source to destination by regular network nodes, instead of dedicated routers. Since each node can be mobile, a route can change dynamically. For example, a node may leave an existing route, causing the route to be obsolete. A node may also join an existing route, resulting in an additional route. Hence, it can be a challenging task to discover and maintain loop-free and stable routes in a wireless ad-hoc network.

The Internet Engineering Task Force (IETF) mobile ad-hoc networks (MANET) working group has proposed several ad-hoc routing schemes: Ad-hoc On-demand Distance Vector (AODV) routing, Optimized Link State Routing (OLSR), Topology Dissemination Based on Reverse-Path Forwarding (TBRPF), Dynamic Source Rouging (DSR), and Dynamic MANET On-demand (DYMO) routing. The TBRPF and OLSR schemes adopt link-state routing, where nodes exchange topology information and determine shortest paths based on the topology. However, both the TBRPF and OLSR schemes can produce routing loops.

AODV, DSR, and DYMO are on-demand routing schemes, under which nodes do not maintain routes for all destinations but only for those with existing traffic. In these schemes, nodes typically discover paths by flooding route requests (RREQ) in the network, which result in route replies (RREP). In DSR, each source node maintains complete path information to each in-use destination. When a path changes, the source uses a path-recovery technique to re-discover the path. Unfortunately, the route re-discovery technique in DSR has been shown to be prone to looping. Both AODV and DYMO use distance labels and sequence numbers to ensure loop-free routes. However, the route-recovery techniques used by AODV and DYMO often involve end-to-end path changes and hence can invalidate many potential loop-free paths. Other routing solutions, while providing localized repairs during a route recovery, are prone to problems such as oscillation, convergence failure, and label space overflow when a new node joins an existing path.

Hence, a need arises for a method and a system that provides loop-free ad-hoc routing without the problems described above.

SUMMARY

One embodiment of the present invention provides a system that facilitates loop-free ad-hoc routing in a wireless network. During operation, the system advertises a local sequence number associated with a local node for a destination node. The system also receives a first route request at the local node, wherein the route request specifies a source node, the destination node, and a first sequence number. Upon receiving this route request, the system selectively maintains a record, which indicates the source node, the destination node, the first sequence number, and a node from which the route request is received. The system also selectively forwards a second route request based on the received route request, wherein the second route request specifies the source node, the destination node, and a second sequence number which is less than the first sequence number and less than or equal to the advertised local sequence number.

In a variation on this embodiment, selectively maintaining the record at the local node involves determining whether the local node has previously received the first route request, and, if not, producing the record.

In a variation on this embodiment, the first route request includes a first time-to-live (TTL) value. The system produces a second TTL value by reducing the first TTL value and determines whether the second TTL is below a threshold. If not, the system includes the second TTL value in the second route request.

In a variation on this embodiment, selectively forwarding the second route request involves setting the second sequence number to be the lesser value of the advertised local sequence number and the first sequence number reduced by a spacing interval.

In a variation on this embodiment, the system determines a sequence number which is greater than any sequence number advertised by a successor node for the destination node with respect to the local node and which is less than the first sequence number specified by the first route request. The system further selectively sends a route reply to the node that sends the first route request, wherein the route reply specifies the determined sequence number.

In a variation of this embodiment, the system initiates a route request for the destination node at the local node. The system includes the advertised local sequence number in the initiated route request, and includes a TTL value in the initiated route request. The system further broadcasts the initiated route request to one or more neighbor nodes.

In a variation of this embodiment, the system receives a route reply for the destination node, wherein the received route reply specifies a third sequence number associated with a node which sends the route reply. The system further selectively forwards a second route reply, based on the first route reply, to a node which sends the first route request, wherein the second route reply contains a sequence number that is greater than the third sequence number.

In a further variation, the first route reply is allowed to include characteristic information about a path for the destination node, thereby facilitating selection of a preferred path to the destination node. Further, the system cryptically authenticates, encrypts, or decrypts a routing control message, which can be a routing request or a routing reply.

In a variation of this embodiment, the local node is identified by an Internet Protocol (IP) address, a locally assigned number, a locally assigned name, a Domain Naming System (DNS) name, an IP subnet address, or a link-layer Medium-Access Control (MAC) address.

Figure 1:
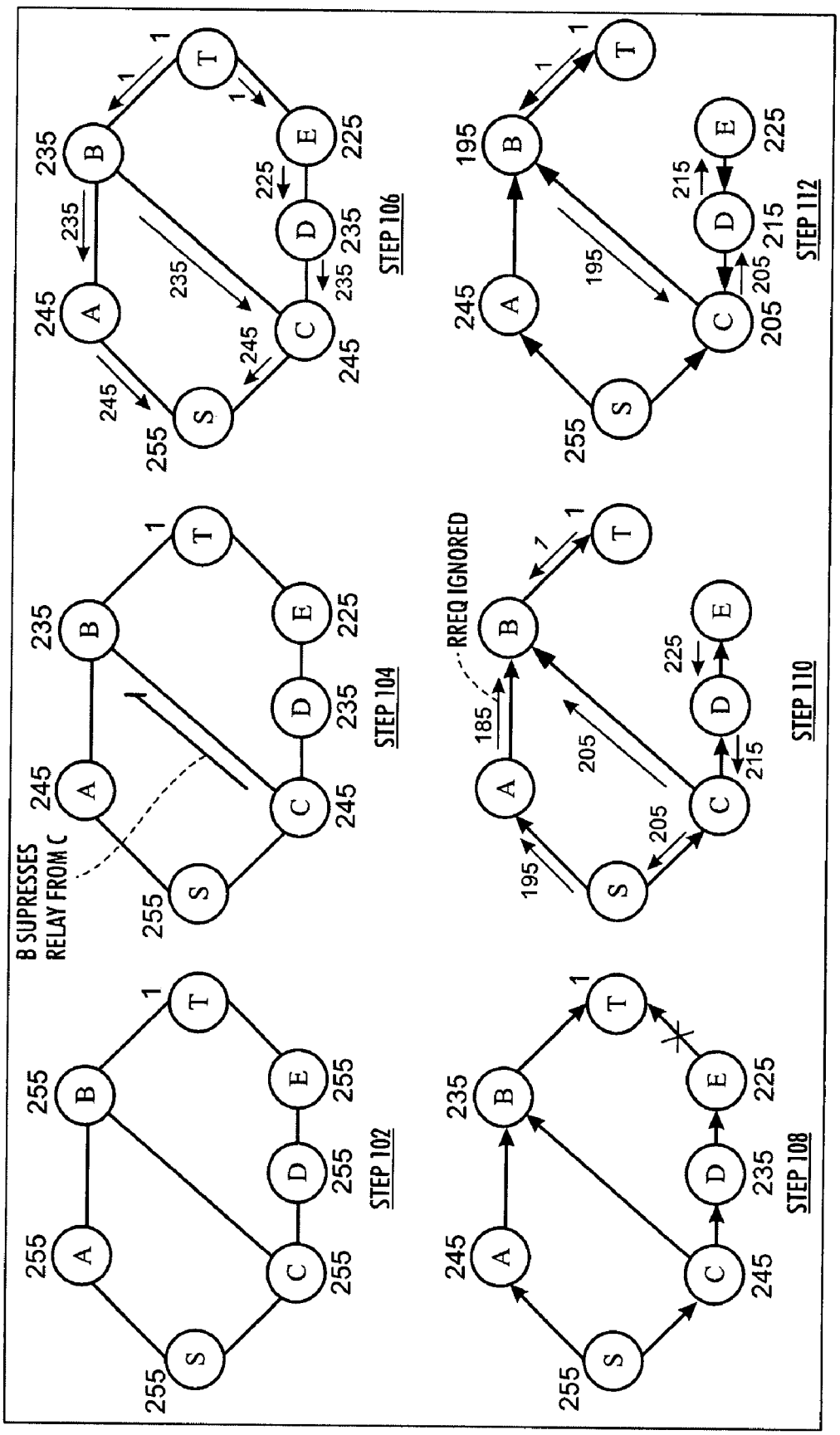
FIG. 1 illustrates a loop-free path discovery process and a path recovery process in accordance with an embodiment of the present invention.

TABLE I lists the notations used in this description in accordance with one embodiment of the present invention.

TABLE II presents a pseudo code for measuring per-next-hop link quality in accordance with one embodiment of the present invention.

TABLE III presents a pseudo code for computing instantaneous link quality in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Embodiments of the present invention adopt a distributed ordered sequence (DOS) routing procedure, which enables localized route repairs and facilitate easy addition of nodes to existing routes. DOS involves a set of distributed ordered sequences for each destination to facilitate a topological sort of abstract node labels. In one embodiment, each node maintains an integer label or sequence number. DOS achieves loop-free routing by having each node along a route maintain a label that is in order with respect to a successor graph. Note that a successor to a node along a route refers to a node that is subsequent to that node when a packet traverses that route from source to destination. Similarly, a predecessor to a node refers to a node that is prior to that node along the route.

The sequence numbers can change frequently as the network topology evolves. Embodiments of the present invention allocate a large number of bits to each sequence number, so that a node can perform many changes to its sequence number per second without sequence-number overflow for a long period. Furthermore, a node ensures that additional nodes can successfully join an existing route by keeping a label spacing between adjacent nodes along the route.

DOS is an on-demand routing scheme, where a node discovers new routes by broadcasting RREQs and receiving replies via RREPs. DOS, however, does not employ destination controlled sequence numbers as in AODV, or source routing as in DSR. Instead, as an RREQ propagates over the network, intermediate nodes adjust the requested label in the RREQ to ensure that any solicited RREP is usable along the entire RREQ reverse-path and at the intermediate nodes.

Routing Procedure

DOS is a hop-by-hop routing procedure that ensures loop-free routes by maintaining node labels in a strict topological order. The description below first explains the label set, or sequence numbers, used by DOS, and then presents three invariants which bind the nodes performing DOS routing. These invariants ensure loop-free routing at all times. DOS employs six procedures to pass routing message: node initialization, route-query initiation, receiving a route query, relaying a route query, route-reply initiation, and receiving a route reply. Note that relaying a route reply is equivalent to receiving and initiating a route reply. DOS uses a route-error handling procedure similar to that used in AODV, which is described in IETF RFC 3561, available at http://tools.ietf.org/html/3561, and which is incorporated by reference herein. Other route-error handling procedures are also possible.

DOS is based on a label set G, referred to as a Global Sequence Number (GSN) space. In this description, "sequence number," "ordering," and "label" all refer to GSN and are used inter-changeably. Let there exist a total order (G, $\leq$), and the associated implied operators "=," "<," and ">." G is therefore a well-ordered set, as is defined in B. S. Schröder, *Ordered Sets: An Introduction*, §2.2 (2003), which is incorporated herein by reference. The ordering operation, ord(•), whose range is G, returns the sequence number of its argument which can be an RREQ or RREP. For instance, when applied to an RREQ q, ord(q) returns the sequence number contained in q. When applied to an RREP r, ord(r) returns the sequence number advertised by r.

In one embodiment, the GSN is an unsigned 128-bit sequence number, so that the GSN space is unlikely to be exhausted in the foreseeable lifetime of a network. For example, over 100 years, if a node performs 100 route computations per second, and DOS skips 100 continuous sequence values per computation to allow additional nodes to join a route, and if such route computations are performed distributively by 100 nodes in parallel, the routing procedure only needs fewer than 52 bits for its GSN space. Other formats and length of GSN are also possible.

In DOS, each node maintains a sequence number for a particular destination. A node along a route determines the next hop by identifying nodes with lower sequence numbers for the destination. At initialization, a node sets the sequence number for a destination to the maximum value, and then decreases this sequence number after receiving routing updates. For example, at a node N, the advertised ordering for a destination D is the minimum label transmitted in a route reply for D. A directed path from node $v_k$ to node $v_0$, $\{v_k, \ldots, v_0\}$, implies that the advertised ordering at each node satisfies $ao_{v_0}^{v_k} > \ldots > ao_{v_o}^{v_o}$. TABLE I lists the definitions of notations used in this description.

Two boundary cases exist: (1) a node itself is the destination; and (2) a node does not have a path to a destination. As a destination, a node i ideally has itself in the corresponding successor set, i.e., $S_i^i = \{i\}$. Node i also has the minimum successor sequence number for itself, i.e., $so_{i,i}^i \leftarrow 0$. This zero sequence number allows node i to respond to any RREQ for destination i (see Eq. 7). In the other boundary case, where node i does not have a path to a destination D, node i advertises a sequence number with a value of infinity, i.e., $ao_D^i \leftarrow \infty$. In one embodiment, the infinity value corresponds to a GSN value of $2^{128}-1$, or a 128-bit binary string of "1."

TABLE I

| Symbol | Definition |
| --- | --- |
| $S_D^A$ | Set of next-hop nodes to destination D at node A |
| $ao_D^A$ | Advertised ordering (GSN) for destination D at node A |
| $so_{D,x}^A$ | Advertised ordering (GSN) by next-hop node x for destination D at node A |
| G | A set of GSNs (integers) |
| ord(·) | A function returning GSN of the argument |

DOS is compatible with existing RREQ flooding procedures, such as the packet cache method of AODV or DSR. With DOS, a node can accept a large predecessor graph, similar to the method described in S. Lee and M. Gerla, "Split Multipath Routing with Maximally Disjoint Paths in Ad-hoc Networks," in *IEEE ICC*, 2001, pp. 3201-05, which is incorporated by reference herein. However, DOS uses the requested ordering of an RREQ, instead of the RREQ hop count, to detect a cyclic RREQ. A node may accept and relay any RREQ with a unique RREQ identifier (RREQ ID). For duplicate RREQ IDs, a node can record the RREQ from the last hop so long as the requested ordering is not less than what the node has already relayed.

To ensure loop-free routing, DOS binds every node with three invariants:

Rule 1 (Non-Increasing Advertisement Ordering (NIAO)): The advertised ordering for a route at a node may not increase. If a node does not have a feasible successor that satisfies an existing advertised label, the node ideally discovers a new successor with a smaller ordering. At a node A, for every destination D with non-empty successor set $S_D^A$ at times $t_1$ and $t_2$, the NIAO invariant can be expressed as:

$$ao_D^A(t_2 > t_1) \leq ao_D^A(t_1). \quad (1)$$

Routes may timeout due to non-use. After a certain cache period, a node may erase the ordering history for a destination. In one embodiment, the cache period is sufficiently long that all nodes that might have had active routes have timed out, and none of the nodes in the network has an active route through a successor that erases its ordering history.

Rule 2 (Smaller Advertisement Condition (SAC)): A node A may accept an advertisement a for destination D if:

$$ord(a) < ao_D^A. \quad (2)$$

Rule 3 (Internal Ordering Condition (IOC)): A node is expected to maintain its internal state such that its advertised label is in order with respect to all in-use successor labels. This condition implies that before transmitting an advertisement for a route, a node ideally ensures that all successor nodes are in order for the new advertised label. The node may need to drop certain successor nodes that do not satisfy the ordering.

If node A is to transmit an advertisement a for destination D, node A is subject to the following requirement:

$$ord(a) > \max \{so_{D,x}^A | x \in S_D^A\}. \quad (3)$$

While every node is bound by these three invariants, DOS employs the following six procedures for passing routing messages.

Procedure 1 (Node Initialization): When a node boots, its successor table and link cost tables are empty. After discovering neighbors, the node typically negotiates and coordinates link costs between itself and the neighbors. DOS does not necessarily use distance—and thus link costs—to maintain loop-free paths. However, these costs as well as other types of link metrices may be included in route advertisements to assist nodes in selecting preferred paths. Furthermore, after booting or rebooting, the node ideally uses a loop-prevention technique, such as the AODV holddown method described in ITEF RFC 3561, to prevent loop formation from stale network states. Other methods for loop-prevention at node initialization are possible.

Procedure 2 (RREQ Initiation): A node A initiating an RREQ q for destination D inserts its current advertised ordering into the RREQ:

$$ord(q) \leftarrow ao_D^A. \tag{4}$$

The node then broadcasts RREQ q to the network. The system can employ different methods for broadcasting the RREQ. In one embodiment, the system adopts the "expanding ring search" method as described in IETF RFC 3561, and sets an appropriate TTL value in the RREQ for the search.

Procedure 3 (Receiving RREQ): Assume that node A receives an RREQ q for destination D originated by node S from last-hop node B. Node A ensures that the RREQ is acyclic, that is, the RREQ is not looped back to node A. In one embodiment, node A determines the uniqueness of the received RREQ based on the RREQ ID. If the RREQ is not unique, node A can drop the RREQ. Otherwise, node A creates a cache entry and stores the tuple $\{S, D, ord(q), B\}$. Generally, a node maintains this cached information sufficiently long for an RRED flooding process to terminate.

If node A is allowed to send an RREP, as described below in conjunction with Eq. 7 below, node A is expected to reply as per Procedure 5. Otherwise, node A relays the RREQ with a decreased TTL as per Procedure 4, which is described below. Since the GSN is not source-specific, if node A has recently transmitted another RREQ q' the reply to which can also satisfy q, node A can optionally suppress relaying q. A reply to RREQ q' can also satisfy RREQ q if and only if q' satisfies Eqs. 5-6.

Procedure 4 (Relaying RREQ): When a node A relays an RREQ for destination D, node A ensures that the ordering of the new RREQ q', is sufficiently small that any solicited RREP may satisfy both node A and all the predecessors thereto. Therefore, node A chooses an ordering for q', subject to the following conditions:

$$ord(q') < ord(q) \tag{5}$$

$$ord(q') \leq ao_D^A. \tag{6}$$

In one embodiment, node A chooses ord(q') to be min{ord (q)–k, $ao_D^A$}. The constant k>0 is a GSN spacing interval between successive hops to allow some slack in the ordering of nodes. This spacing interval allows new nodes to join the path without forcing a route request to traverse extra hops.

Procedure 5 (RREP Initiation): A node A receiving an RREQ q for destination D is allowed to send an RREP if the following condition is true:

$$\exists g \in G, x \in S_D^A : so_{D,x}^A < g < ord(q). \tag{7}$$

If such an ordering g exists, node A chooses a specific ordering g*, such that g* is the maximum ordering that satisfies Eq. 7 and the NIAO invariant. If the system uses a k-skip spacing interval between nodes, g* includes as much skip space, up to k, as possible while satisfying the bounds of Eq. 7. Upon choosing the appropriate g*, node A sets:

$$ao_D^A \leftarrow g^*, \tag{8}$$

and transmits the RREP to the corresponding last-hop node which has transmitted the RREQ.

A destination node replying to an RREQ can choose to advertise a label value of "1." This choice is consistent with both Eq. 7 and the IOC invariant. Note that a choice of "0" violates both conditions. Advertising with a constant, minimum label value for a destination node affords all one-hop neighbor nodes sufficient flexibility in choosing new labels and replying to queries on behalf of the destination. All other nodes can choose the maximum g* to preserve the sequence number space over time.

Procedure 6 (Receiving RREP): A node A receiving RREP r from a node B for destination D may accept the RREP subject to the SAC invariant. If SAC is satisfied, node A can add node B to its successor set $S_D^A$ and cache $so_{D,B}^A \leftarrow ord(r)$. If node A is not the terminus for the RREP, node A may issue a new RREP for D as per Procedure 5 and send the new RREP to any last-hop nodes corresponding to the RREQ that are satisfied by the new reported route based on the RREQ cache entries. In one embodiment, any such satisfied cache entries are marked "satisfied," or otherwise removed to prevent future RREP generation.

The number of relayed RREPs based on cached information can significantly affect protocol overhead. In one embodiment, the system allows promiscuous overhearing of control packets. A node sends at most one unicast RREP per RREQ origin and per last-hop node. The node can choose randomly among last-hop nodes based on the minimum RREQ distance. Thus, a relay node R, for a given RREQ origin, say A, where an RREQ was received from last-hop nodes B and C, can send at most one RREP. Node R can choose between nodes B and C based on the RREQ distance from each of these nodes. If node R also satisfies another origin node Z via nodes B and X, node R can choose the minimum-distance node, even though node B could be a minimum-overhead choice. In a further embodiment in which the system employs promiscuous overhearing, a node does not relay an RREP unless the node is the unicast destination for the RREP.

EXAMPLES

FIG. 1 illustrates a loop-free path discovery process and a path recovery process in accordance with an embodiment of the present invention. In this example, the system is assumed to employ an 8-bit sequence number and a k-skip spacing interval of 10. Steps 102-106 illustrate an exemplary path discovery process. In step 102, an ad-hoc network is in its initial state, where a source node S seeks a path to a destination node T. Initially, every node sets its advertised label for destination T to be 255, the maximum value. Node T, being the destination, sets its label to "1."

In step 104, node S initiates an RREQ for node T with a requested ordering of 255. Nodes A and C, not having a valid route, relay the request with a new requested ordering of 245. In this example, node B processes node A's copy of the RREQ before node C's copy. Node B relays the request from node A and also caches C as an RREQ predecessor with requested ordering of 245. After receiving the RREQs, node T begins sending RREPs. In step 106, node T replies with an advertised ordering $ao_T^T$ of 1. Node B, when relaying the replies, chooses a maximum feasible ordering, which in this case is 235 based on the k-skip spacing interval of 10.

Node B then sends an RREP to both nodes A and C, because the new route satisfies both RREQs. Note that the system could use other last-hop relaying rules such as those described above. Nodes A and C subsequently relay the RREPs to node S to complete the RREP operation. In a further embodiment, when node C receives the RREP from node D, node C may use the {C, B, ...} and {C, D, ...} paths as unequal-cost multiple paths.

Steps 108-112 illustrate an exemplary path recovery process. In step 108, node E loses the link to destination T and initiates an RREQ flooding process. The RREQ traverses the network as is shown in step 110. Note that node relaying an RREQ do not break their successor links. Thus, nodes C and D maintain their respective links through node E until node E transmits error messages. Node B receives two copies of the RREQ. The first copy, forwarded by node C, has an ordering of 205, and the second copy, forwarded by node A, has an ordering of 185. Node B responds the RREQ from node C based on its cache entries and does not relay the RREQ. Furthermore, node B recognizes the RREQ from node A as acyclic, and may choose to respond to that RREQ. It is acyclic by definition because node B has not relayed the RREQ. However, using the rules for multiple RREPs described above, node B can choose not to respond to the RREQ from node A, because, based on the label values contained in the RREQs, the path traversed by the RREQ from node A is longer than the path traversed by the RREQ from node C. Step 112 shows the final successor graph with new node labels. Note that only nodes B, C, D, and E change their labels to repair the route.

Figure 2:
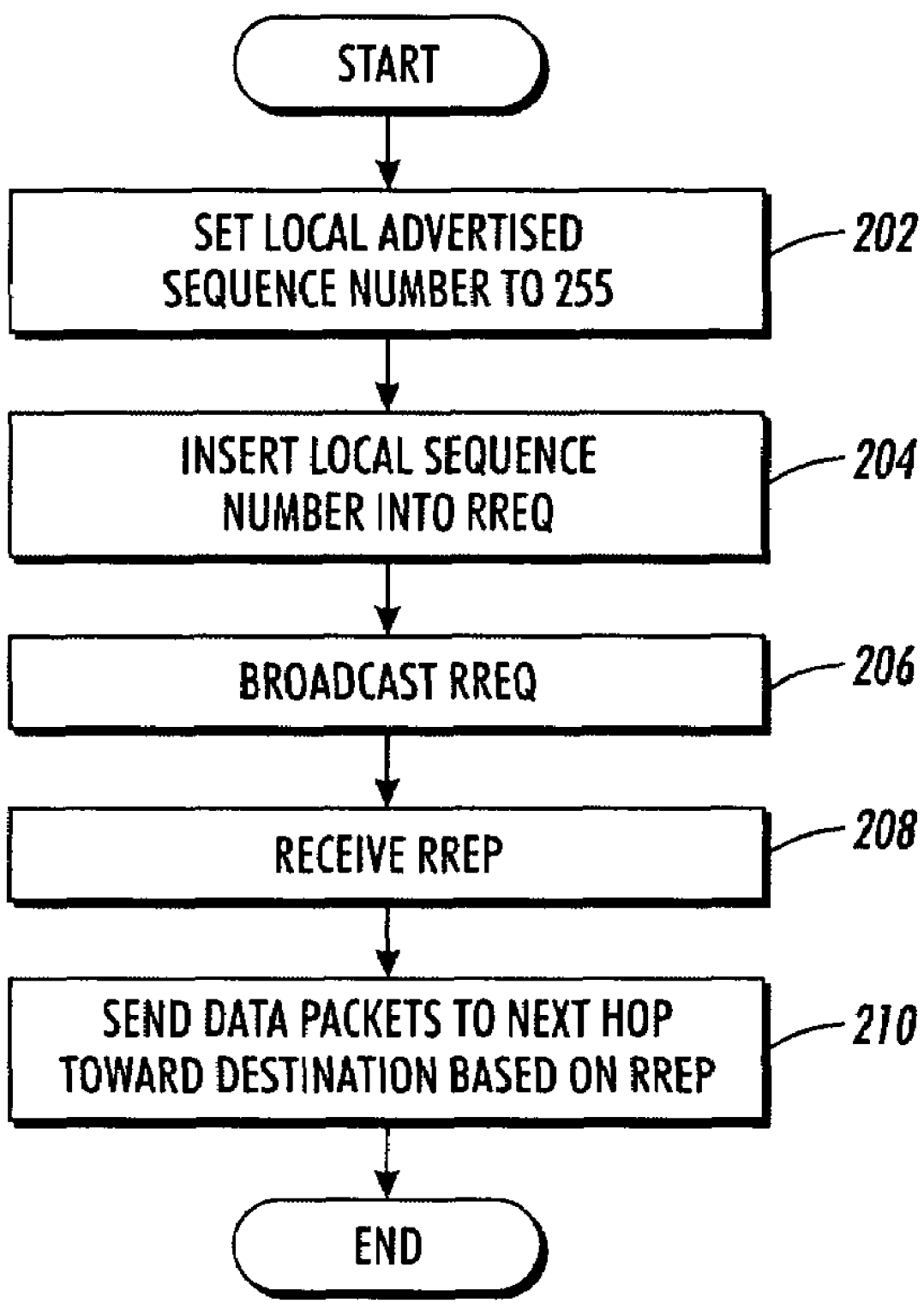
FIG. 2 presents a flow chart illustrating the process of a source node initiating an RREQ and receiving an RREP in accordance with an embodiment of the present invention.

FIG. 2 presents a flow chart illustrating the process of a source node initiating an RREQ and receiving an RREP in accordance with an embodiment of the present invention. During operation, the system sets a local advertised sequence number to 255 for a given destination (step 202), and inserts this local sequence number into an RREQ (step 204). The system then broadcasts this RREQ (step 206). In response, the system receives at least one RREP (step 208). The system subsequently sends data packets to the next hop node toward the destination based on the received RREP (step 210).

Figure 3:
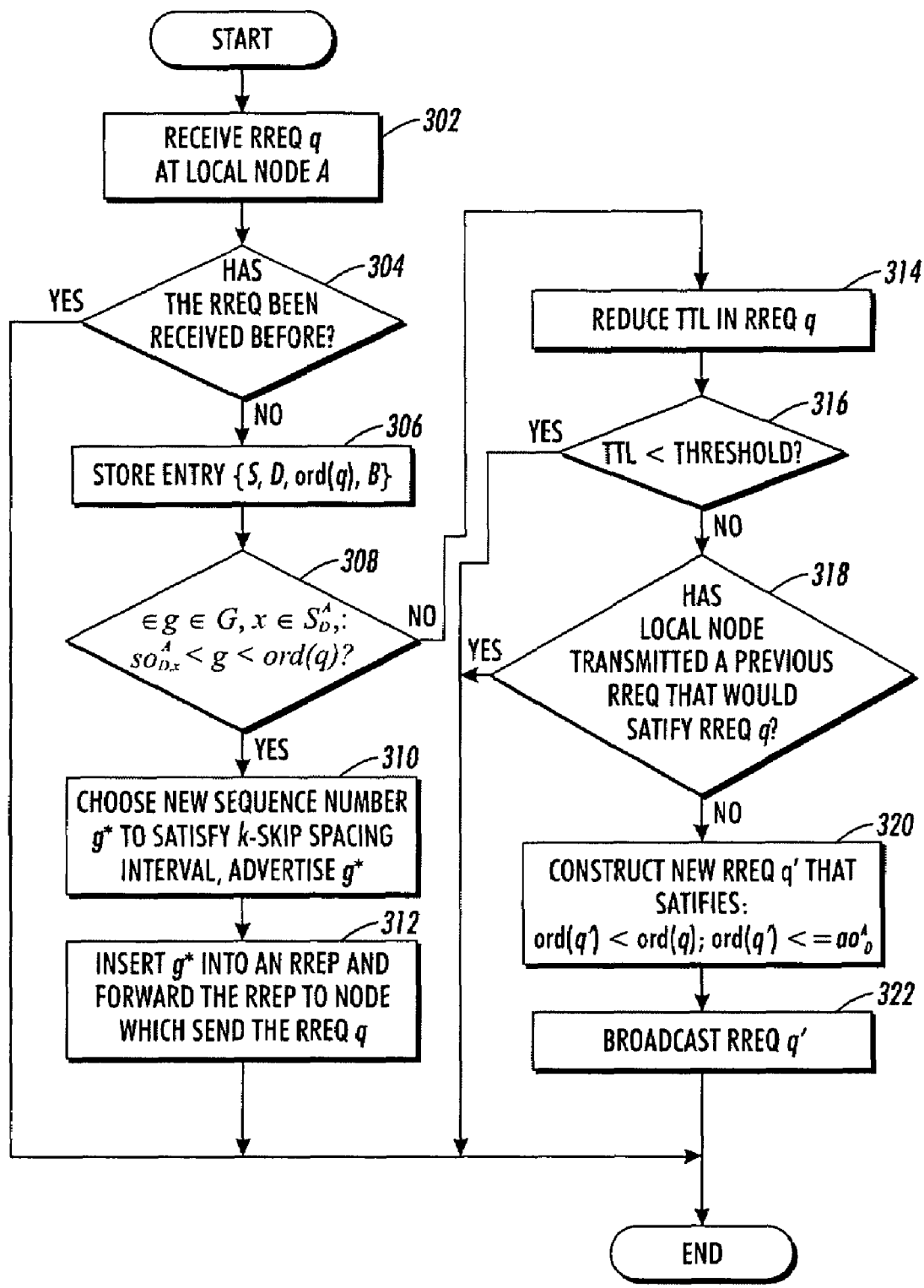
FIG. 3 presents a flow chart illustrating the process of a node processing a received RREQ and responding with an RREP in accordance with an embodiment of the present invention.

FIG. 3 presents a flow chart illustrating the process of a node processing a received RREQ and responding with an RREP in accordance with an embodiment of the present invention. During operation, the system receives and RREQ q at a local node A (step 302). The system determines whether this RREQ q has been received before (step 304). If so, the system drops RREQ q and exists. If not, the system stores a cache entry {S, D, ord(q), B}, where S is the source, D is the destination, and B is the node from which node A receives RREQ q (step 306).

The system subsequently determines whether a local sequence number g is available that is greater than a sequence number advertised by a successor node and less than the sequence number contained in RREQ q (step 308). If available, the system chooses such a sequence number g* that satisfies the k-skip spacing interval and advertises g* (step 310), inserts g* into an RREP, and forwards the RREP to the node which sends RREQ q (step 312).

Otherwise, the system relays RREQ q. The system reduces the TTL value in RREQ q (step 314) and determines whether the reduced TTL value is below a threshold (step 316). If below, RREQ q has reached its TTL limit and the system exists accordingly. If not, the system further determines whether the local node has previously transmitted an RREQ that would satisfy RREQ q (step 318). If so, the system exists.

Otherwise, the system constructs a new RREQ q' based on Procedure 4 (step 320). The system subsequently broadcasts RREQ q' (step 322).

Analysis

The following description presents proof of several properties of DOS. A node performing DOS routing maintains predecessor ordering at all times. Hence, any changes a node makes to its own advertised ordering does not bring a predecessor out of order. Furthermore, as is shown in the proof below, a DOS-compliant node also maintains successor ordering. Any changes a node makes to its successor graph or to its own advertised ordering still maintain the global ordering of the network.

A combination of these properties and the IOC invariant is sufficient to show that DOS maintains a global ordering of the network at all times. The proof below further shows that DOS is lockout-free; that is, given multiple concurrent route request and reply operations for the same destination, every origin of a route request is guaranteed to find a route. The proof of these properties is described as theorems and the corresponding proof for each theorem is presented below.

Theorem 1 (Predecessor Ordering): If every node obeys NIAO, SAC, and IOC invariants, then a node i choosing a new advertised ordering $ao_D^i(t)$ for destination D at time t maintains ordering with all predecessors. That is, in an existing successor graph for destination D, node i maintains:

$$ao_D^i(t) < \min\{ao_D^j(t) | \forall j : i \in S_D^j\}. \quad (9)$$

Proof The premise of "an existing successor graph" implies that at some time $t_0$ node i transmitted an advertisement $a(t_0)$, which resulted in a predecessor link between some predecessor nodes j and i. Assume that node j processes $a(t_0)$ at time $t_1$ and creates an edge (j, i). At some other time $t > t_0$, node i changes its advertised ordering. It can be shown that node i maintains the bound for an arbitrary predecessor, thereby maintaining Eq. 9.

The premise of existing predecessor can be expressed as:

$$i \in S_D^j. \quad (10)$$

By the SAC invariant, the following derivation is true:

$$v \in S_D^j \Rightarrow ord(a(t_0)) < ao_D^j(t_1). \quad (11)$$

The NIAO invariant can be expressed as:

$$ao_D^j(t_1) \leq ao_D^j(t < t_1), \forall t < t_1. \quad (12)$$

By Eq. 11 and 12, the following is true:

$$ord(a(t_0)) < ao_D^j(t < t_1). \quad (13)$$

By the NIAO invariant, at time t, $$ao_D^i(t_0 < t) \leq ao_D^i(t_0) \quad (14)$$

$$\Rightarrow ao_D^i(t_0 < t) \leq ord(a(t_0)). \quad (15)$$

By Eqs. 13 and 15, and that $t_1 > t_0$, $$ao_D^i(t_0 < t < t_1) \leq ao_D^j(t). \quad (16)$$

By the IOC invariant and Eq. 10, the following is true:

$$ord(a(t_0)) < ao_D^j(t_1 < t). \quad (17)$$

By Eqs. 15 and 17, $$ao_D^i(t_1 < t) \leq ao_D^j(t). \quad (18)$$

Further, by Eqs. 16 and 18, $$ao_D^i(t_0 < t) \leq ao_D^j(t). \quad (19)$$

Eq. 19 shows that any new advertised ordering of node i after time to is less than the ordering at any existing predecessor node j. The key elements to the proof are that advertised orderings never increase, which is the NIAO invariant, and that once a predecessor accepts a successor, the predecessor ensures its label to be greater than the successor's advertised ordering, which is the IOC invariant.

Theorem 2 (Successor Ordering): Without creating a routing table loop, node i may accept advertisement a if the advertisement satisfies the SAC invariant: $ord(a(t_0)) < ao_D^i$.

Proof Let node j have a loop-free path to destination D and be the issuer of a. At time $t_0$, node j sets its advertised label to $ao_D^j(t_0)$, sets $ord(a(t_0)) \leftarrow ao_D^j(t_0)$, and subsequently transmits a. At time $t_1$, node i processes the advertisement a. For node i to accept a, by the SAC invariant $ord(a(t_0)) < ao_D^i(t_1)$, the condition $ao_D^j(t_0) < ao_D^i(t_1)$ holds. Further, by the NIAO invariant $ao_D^j(t_1) \leq ao_D^j(t_0)$, the condition $ao_D^j(t_1) < ao_D^i(t_1)$ holds. Note that node i may have the "∞" label if node i does not have a path to D. If node i subsequently advertises a route to D, by the IOC invariant, node i either ensures that the new advertised label maintains order with $ord(a(t_0))$, or drops the route through node j.

Theorem 3 (Loop-free Paths): As an advertisement propagates hop-by-hop, the resulting path is loop-free.

Proof Theorem 2 establishes that each independent per-hop decision maintains local loop-freedom. The following proof shows that, by induction over multiple hops, a constructed path is loop-free. First, assume that an RREP path exists from node $v_0$ to node $v_k$, where node $v_0$ is the destination. Denote the time at which node $v_i$ receives the route advertisement as $t_i^{in}$ and the time at which node $v_i$ advertises the route as time $t_i^{out}$.

Based on Theorem 2, where $v_0$ relays the advertisement from node $v_0$, the condition $ao_{v_0}^{v_0}(t_1^{out}) < ao_{v_0}^{v_1}(t_1^{out})$ holds. By strong induction, assume that node i has a loop-free path satisfying $ao_{v_0}^{v_1}(t_i^{in}) < \ldots < ao_{v_0}^{v_{i+1}}(t_{i+1}^{in})$. Additionally, based on Theorem 2, condition $ao_{v_0}^{v_i}(t_{i+1}^{in}) < ao_{v_0}^{v_{i+1}}(t_i^{in})$ holds. By the NIAO and IOC invariants, condition $ao_{v_0}^{v_0}(t_{i+1}^{in}) \leq ao_{v_0}^{v_0}(t_i^{in}), < \ldots < ao_{v_0}^{v_i}(t_i^{in}) \leq ao_{v_0}^{v_i}(t_{i+1}^{in})$. The final path satisfies the condition $ao_{v_0}^{v_0}(t_{i+1}^{in}) < \ldots < ao_{v_0}^{v_i}(t_{i+1}^{in}) < ao_{v_0}^{v_{i+1}}(t_{i+1}^{in})$, and maintains a strict topological order. Hence, the graph is acyclic.

Theorem 4 (Loop-freedom): DOS is loop-free at all times.

Proof By Theorem 3, all successor paths are in-order at all times. By the IOC invariant, a node also maintains its own label in order with respect to successor nodes. By Theorem 1, a node maintains its own label in order with respect to predecessor nodes. Hence, the network graph is maintained in order at all times, and the graph is acyclic.

The DOS routing procedure can also be shown to be lockout free. Lock-free operation means that, given a connected, lossless network, any given node can find a route over any possible node labels, regardless of how many other nodes are attempting to find routes to the same destination. In other words, there are no "black holes." Possible node labels are those reachable through the application of DOS routing rules. The proof below first shows that, in response to a route request, a route-reply operation finds a route. The proof further shows that DOS is lockout-free even when there are multiple concurrent request/reply computations for the same destination. The network is assumed to be connected, lossless, and to have stable links.

Theorem 5 (Procedure 5 Correctness): An RREP generated by a node satisfying Procedure 5 is feasible for the RREQ last-hop node.

Proof Assume that node A receives from last-hop node B an RREQ q with ordering $ord(q)$. By Procedure 5, the advertised ordering of node A will be $ao_D^A \leftarrow g^*$, which is less than the requested ordering: $ao_D^A < ord(q)$. The reply is feasible based on the SAC invariant.

Theorem 6 (Minimum Label Relaying): If a node relaying an RREQ requests an ordering that satisfies Eq. 5 and 6 in Procedure 4, then any solicited RREP is feasible for the relay node and the RREQ reverse path.

Proof Consider a request traversing the path $\{v_k, \ldots, v_0\}$. Assume that a node without a path to destination uses the "∞" label. Let node $v_i$ issue an RREQ $q_i$ with label $ord(q_i)$. Node $v_{i-1}$ provides an RREP $r_{i-1}$ with label $ord(r_{i-1})$, such that $ord(r_{i-1}) < ord(q_i)$.

This proof is by induction over the hops the RREP traverses from node $v_0$ The base case is to show that the RREP received by node $v_1$ is feasible at node $v_2$, establishing the first relay. The proof then shows that an RREQ received by node $v_i$ is feasible at node $v_{i+1}$.

The proof that RREP $r_0$ sent by node $v_0$ is feasible at node $v_2$ is presented in Eqs. 20-25. Eq. 24 ties RREP $r_0$ to $r_1$, because node $v_1$ can create its route entry based on $r_0$. The proof shows that RREP $r_1$ is in-order with respect to RREQ $q_2$ sent by node $v_2$. Therefore, RREP $r_1$ is feasible at node $v_2$.

By Procedure 4, $$ord(q_1) < ord(q_2). \tag{20}$$

By Theorem 5, $$ord(r_0) < ord(q_1). \tag{21}$$

By Procedure 6, $$so_{v_0,v_0}^{v_1} \leftarrow ord(r_0). \tag{22}$$

Therefore, $$ord(r_0) < ord(q_1) < ord(q_2) \tag{23}$$

$$\Rightarrow \exists g, x : so_{v_0,x}^{v_1} < g < ord(q_2). \tag{24}$$

By Procedure 5, $$ord(r_1) < ord(q_2) \tag{25}$$

In the inductive step, assume that node $v_{i-1}$ sends an RREP $r_{i-1}$ to node $v_i$ and that node $v_i$ relays RREP $r_i$ to node $v_{i+1}$. The proof to show $ord(r_i) < ord(q_{i+1})$ is identical to the case of node $v_1$ relaying $r_0$ to $v_2$.

Theorem 7 (Lockout-free): DOS is lockout-free in a connected, lossless network for multiple concurrent route requests for the same destination. Every node that originates a route request can receive a feasible route reply.

Proof: For lockout to occur, the paths of two replies typically cross at one or more intermediary nodes. For example, the first reply to cross such intermediary node changes the state at that node such that (1) the intermediary node cannot accept a second reply, and that (2) the intermediary node cannot generate its own reply for the second origin. The following proof by contradiction shows that conditions (1) and (2) cannot be simultaneously true.

Consider an intermediary node v that receives and relays query $q_1$ from predecessor node $w_1$ and query $q_2$ from predecessor node $w_2$. The predecessor nodes $w_1$ and $w_2$ could be identical or distinct. The relayed queries are $q_1'$ and $q_2'$. Without loss of generality, assume that reply $r_1$ to $q_1'$ arrives first at time $t_1$, followed by reply $r_2$ to $q_2'$ at time $t_2$.

For condition (1) to be true, condition $ao_D^v(t_2) \leq ord(r_2)$ holds. Therefore, reply $r_2$ is not feasible at node v. However, by Theorem 6 $ord(r_2) < ord(q_2')$, condition $ao_D^v(t_2) < ord(q_2')$ holds. By Procedure 4 $ord(q_2') < ord(q_2)$, condition $ao_D^v(t_2) < ord(q_2)$ holds. This result contradicts with condition (2), because node v can generate a feasible reply to query $q_2$.

For condition (2) to be true, condition $ord(q_2) \leq ao_D^v(t_2)$ holds. By Procedure 4 $ord(q_2') < ord(q_2)$, condition $ord(q_2') < ao_D^v(t_2)$ holds. By Theorem 6 $ord(r_2) < ord(q_2')$, condition ord($r_2'$)<ao$_D$'($t_2$) holds. This result contradicts with condition (1), because reply $r_2$ is feasible at node v.

In a network with failures, however, conditions (1) and (2) in Theorem 7 could be simultaneously true. Node v could receive reply $r_1$ at time $t_1$, lose the route, and then receive $r_2$ at time $t_2$. At time $t_2$, reply $r_2$ might not be feasible at node v, and node v might not have any active route to the destination. Generally, routing might not converge if the network state changes faster than the control messages can be delivered and processed.

DOS Implementation

One embodiment of the present invention employs several optimizations in implementing DOS. One implementation adopts link-layer loss detection, so if a unicast packet is dropped by the MAC layer, the network layer can re-transmit the packet. The network layer can also manipulate the link-layer queue to remove or re-queue packets.

In addition, packets are classified by priority, the order of which is Address Resolution Protocol (ARP), DOS, and Constant Bit Rate (CBR). ARP packets generally are not present at the network layer. Nevertheless, the same priority scheme applies if more than one packet is queued at the link layer. In one embodiment, the system permits up to 50 packets over all destinations. Although this queuing capacity is slightly less than in DSR and AODV implementations, an advantage is that the next-hop determination is deferred until just before packet transmission.

In DSR and AODV implementations, the routing protocol determines the next hop, and then releases many packets to the link layer without any assurance that the next hop is still valid by the time a packet arrives at the radio interface. Embodiments of the present invention do not employ "local repair" techniques. Instead, if an intermediary node has a foreign packet and does not have a route to the destination, the intermediary node typically broadcasts a routing error message and drops the foreign packet.

In the RREP process, a node does not add a successor to the routing table until the node has a link-layer MAC address for the next hop. If DOS does not see a MAC-layer ARP entry, the system sends a unicast ECHO message (new control packet) to the next hop, at a rate of no more than one ECHO messages per three seconds per next hop.

In the RREQ process, a node uses an initial TTL value of 2, a re-try TTL value of 6, and then up to three network-wide floodings with a TTL value of 30. If a node fails the RREQ discovery after three network-wide floodings, the node triggers an RREQ hold-down to prevent initiating an RREQ for the failed destination for three seconds. The RREQ process is otherwise as described above. Nodes cache a route for up to 10 seconds without use before timing out the route.

In a further embodiment, DOS also allows control-packet aggregation for packets destined to the same next hop. The system scans the per-destination packet queues and aggregates any control packets for the same destination, up to the maximum User Datagram Protocol (UDP) packet size. DOS uses a promiscuous mode to overhear RREPs to build a route-cache. However, DOS can function properly without the promiscuous mode.

TABLE II

PeriodicLinkQuality(N, w)
1   uses ← N.last_uses + N.current_uses
2   loss ← N.last_loss + N.current_loss
3   uses ← max{uses, loss}
4   IF uses > 0

TABLE II-continued 5       newquality ← (uses − loss)/uses
6   ELSE
7       newquality ← 1.0
8   quality ← w * newquality + (1−w)*N.quality
9   RETURN quality

TABLE III

InstantLinkQuality(N, w)
1   uses ← N.last_uses + N.current_uses
2   loss ← N.last_loss + N.current_loss
3   uses ← max{uses, loss}
4   IF uses > 1
5       quality ← w * N.quality + (1−w)*(uses−loss)/uses
6   ELSE
7       quality ← 1.0
8   RETURN quality DOS can also use per-next-hop link quality measurements at the network layer based on the number of packets forwarded to each next hop and the number of packet drops per next hop. The link quality for node N is measured as a moving average over 1-second buckets with a weight of 0.75, as is shown by the pseudo code in TABLE II. This approach weights long-term link quality towards the historical value. In one embodiment, the system smoothens the data over the current 1-second bucket and the previous 1-second bucket to reduce boundary effects where a packet is transmitted in one bucket and lost in the next bucket. Each link is assumed to begin with a link quality of 1.0.

Whenever packet loss occurs, DOS computes an instantaneous link quality with a weight of 0.4, as is show by the pseudo code in TABLE III. This approach weights the instantaneous link quality towards the current value. The variables last_uses and current_loss are the number of packets dropped after the MAC layer retries for a given next hop in the last or current time bucket. If the quality value returned by the procedure in TABLE III is less than a global threshold LQ_THRESH, then the next hop is considered down and is removed from the forwarding table. In one embodiment, LQ_THRESH begins approximately at 0.85. As a node initiates more RREQs, the bound is lowered, allowing lower quality links. Over time and after more link-layer drops, the bound is raised back towards the target 0.85 level. In a further embodiment, the system imposes a floor of 0.7 to LQ_THRESH.

In a further embodiment, DOS adopts a link-quality weighted, minimum distance multi-path routing. Over all multiple paths or minimum distance, DOS can randomly distribute packets over the next hops in proportion to their respective link quality. In addition, DOS can employ various network-security measures. For example, a node can cryptographically authenticate, encrypt, or decrypt routing control messages.

Note that the loop-free condition used in DOS, the GSN, is a distributed sequence number. That is, any node correctly performing the DOS routing scheme can change the value of the sequence number in accordance with proper conditions and constraints of DOS. Other routing protocols typically have either a source-controlled sequence number or a destination-controlled sequence number. These source- or destination-controlled sequence numbers are often used in conjunction with other parameters such as distance or hop-count which is changed in-transit.

For example, a protocol like AODV uses a destination-controlled sequence number and a hop-count. The sequence number used to advertise a route is set by the destination, and the hop-count is manipulated by intermediate nodes. Protocols that use a source-controlled sequence number, such as the Labeled Successor Routing (LSR) protocol described in "Efficient Use of Route Requests for Loop-free On-demand Routing in Ad Hoc Networks," H. Rangarajan and J. J. Garcia-Luna-Aceves, Networking 2005, LNCS 3462, pp. 1096-1107 or the Destination-controlled Labeled Successor Routing (DLSR) protocol described in "On-demand Loop-free Routing in Ad Hoc Networks Using Source Sequence Numbers," H. Rangarajan and J. J. Garcia-Luna-Aceves, *IEEE Mobile Adhoc and Sensor Systems Conference*, 2005, use immutable timestamps set by the source of an RREQ. In contrast, DOS uses a single numeric invariant to order nodes in a directed acyclic graph that is not necessarily a tree.

DOS supports multi-path traffic, which is a clear advantage in mobile ad hoc networks where links and link quality change, because the GSN is not path specific. Any node receiving an advertisement with an in-order GSN may use that advertisement to build a path. LSR and DLSR, in comparison, record timestamps along a path and test the feasibility of an advertisement based on those recorded timestamps. LSR also gives special treatment to advertisements originated by the destination, but this may lead to routing loops when packets are delayed at the MAC layer because there are no criteria to order such RREPs. Additionally, LSR only relays RREPs originated by the destination itself, which means that path repairs are large-scale changes in the network. DSLR also requires the destination itself to issue an RREP. The extension of DSLR which allows intermediate nodes to issue an RREP requires storing much more state information at both nodes and in RREQ packets.

Note that a node can be identified by an Internet Protocol (IP) address, a locally assigned number, a locally assigned name, a Domain Naming System (DNS) name, an IP subnet address, or a link-layer Medium-Access Control (MAC) address. Furthermore, a node may have multiple network interfaces. A routing control messages can be identified by an unique name that is independent from the interface. The operation of DOS on nodes with multiple network interfaces is largely the same as single interface nodes. In one embodiment, a node has a single unique identifier used over all interfaces, such as a loop-back IP address or DNS name. This unique identifier is what is used in control messages, not a per-interface address. This scheme is similar to the "Main Address" idea of OLSR (Optimized Link State Routing Protocol, IETF RFC 3626), except nodes do not need to advertise interface associations. When a node transmits a RREQ, it identifies its unique address as the RREQ source and an interface-specific address as the RREQ last-hop. Likewise, when a node transmits an RREP, it identifies the unique address as the destination and an interface address as the last-hop. Other variations in systems with multiple interfaces are possible.

Simulation Results

A number of random-waypoint simulations are conducted to compare performances between DOS, DSR, and AODV. In general, DSR and AODV have approximately the same delivery ratio and latency. At times, DOS has a better delivery ratio, while AODV has a better end-to-end latency. DOS has a significantly lower network load, on the order of $\frac{1}{2}$ to $\frac{1}{5}$ the load of AODV. DSR, in most cases, performs worse than AODV or DOS, except in low-mobility cases. In terms of packet loops, DOS demonstrates about $\frac{1}{2}$ to $\frac{1}{10}$ the loop ratio of AODV, and about $\frac{1}{1000}$ the loop ratio of DSR. Additional simulations for DOS are conducted without multi-path routing and without using DOS link-quality measurements. Removing these features does not change the overall performance, but does narrow the differences in network load.

The communication channel is assumed to be an 802.11 MAC at 915 MHz with 2 Mbps bandwidth. The simulated 50 nodes are within a 1500 m×300 m rectangle, and the simulated 100 nodes are within a 2200 m×600 m rectangle. Traffic patterns are 512-byte CBR flows for 10 sources and 30 sources, respectively. The simulated time is 900 s, and the pause times used are 0 s (no pauses), 100 s, 300 s, 500 s, 700 s, and 900 s (no mobility). For each configuration with a given number of nodes, sources, and pause time, 10 trials are generated with different random-number seeds. The results show the mean performance with a 95% confidence interval.

The metrics used in the simulations are delivery ratio, latency, network load, and loop ratio. Delivery ratio is the number of CBR packets received by the destination nodes divided by the number of CBR packets sent by the source nodes. Latency is the one-way end-to-end delay between the moment when source generates a CBR packet and the moment when the destination receives the packet. The network load is the total number of network-layer control packets, such as RREQ, RREP, and error messages, divided by the total number of CBR packets received at the destinations.

Loop ratio is the total number of duplicate hops divided by the total number of CBR packets sent by the sources. A loop ratio of 1.0 means that on average, each CBR packet loops through one duplicate node somewhere along its path. A loop ratio of 0 means that a packet never traverses the same node twice. The none-zero loop ratio in the DOS simulations is the result of packet queuing. During the lifetime of a packet, while queued at intermediate nodes, the routing topology may change and a packet may find itself re-visiting a node. The term "loop-free" hence means that routing tables do not point in a directed cycle at any given instant.

Figure 4:
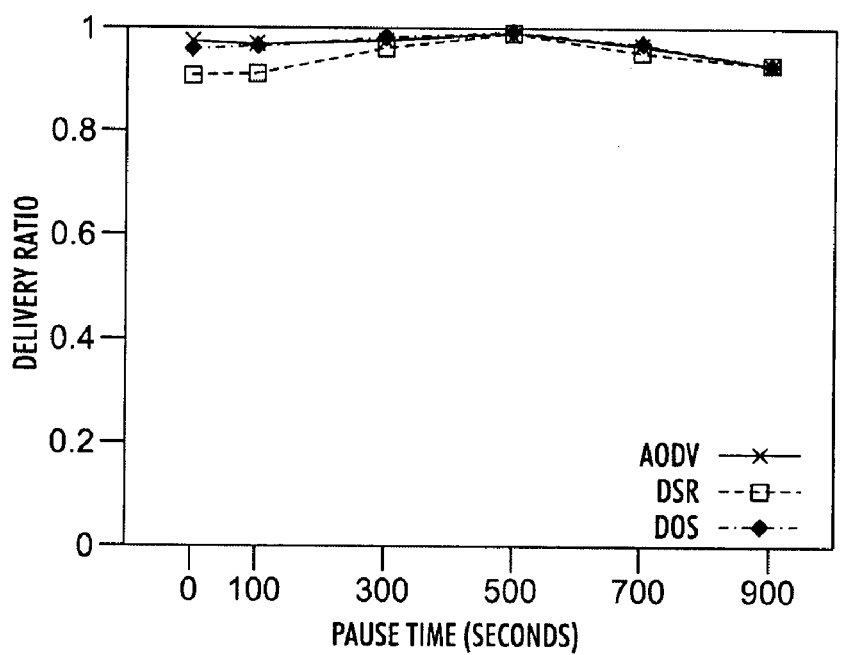
FIG. 4 compares the delivery ratio of DOS with those of AODV and DSR in a simulated network with 50 nodes and 10 sources, in accordance with an embodiment of the present invention.
Figure 5:
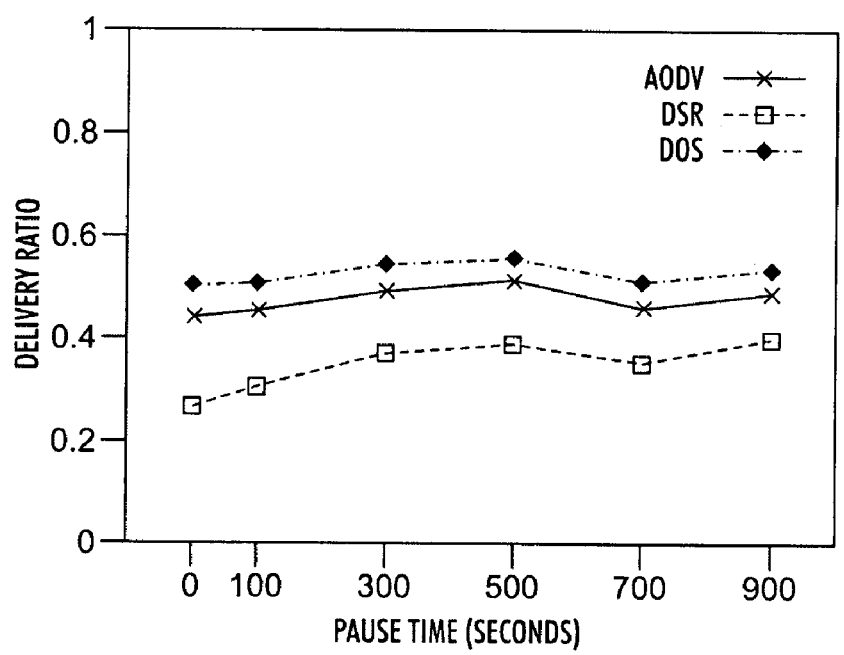
FIG. 5 compares the delivery ratio of DOS with those of AODV and DSR in a simulated network with 50 nodes and 30 sources, in accordance with an embodiment of the present invention.
Figure 10:
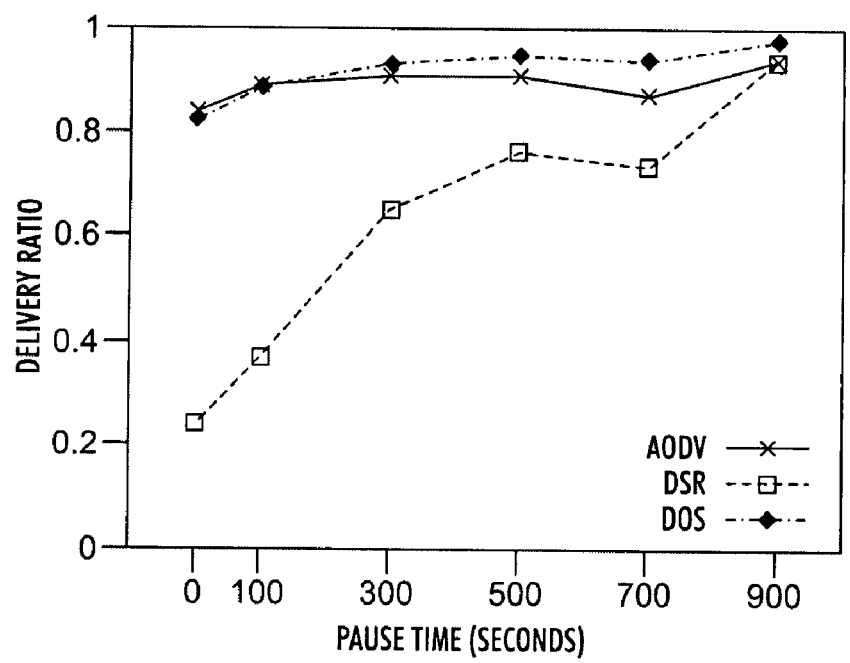
FIG. 10 compares the delivery ratio of DOS with those of AODV and DSR in a simulated network with 100 nodes and 10 sources, in accordance with an embodiment of the present invention.
Figure 11:
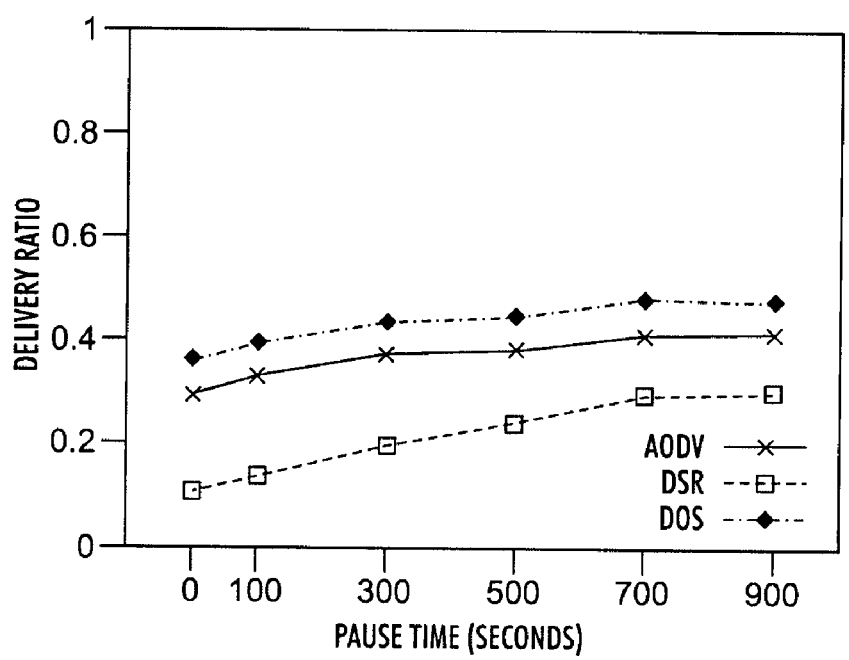
FIG. 11 compares the delivery ratio of DOS with those of AODV and DSR in a simulated network with 100 nodes and 30 sources, in accordance with an embodiment of the present invention.

FIGS. 4, 5, 10, and 11 show the delivery ratio comparison. As is shown in FIG. 4, at low load, DOS, DSR, and AODV have substantially equivalent delivery ratios. At medium load, as is shown in FIGS. 5 and 10, DOS and AODV have substantially equivalent delivery ratio, but the delivery ratio of DSR is significantly lower except in low mobility (high pause time) cases. At high load, as is shown in FIG. 11, DOS has the best delivery ratio at high mobility (0 s and 100 s pause time), but is otherwise substantially tied with AODV.

Figure 6:
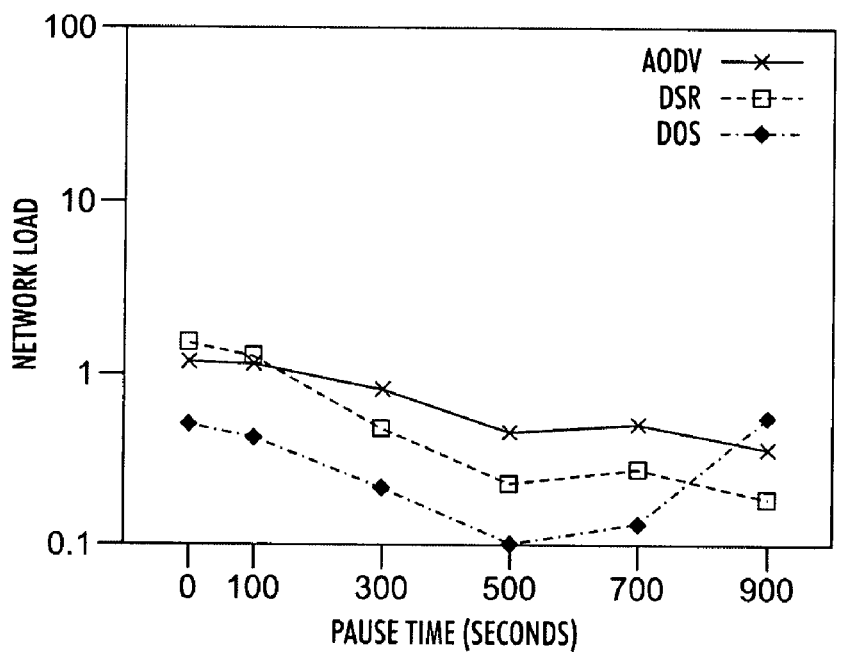
FIG. 6 compares the network load of DOS with those of AODV and DSR in a simulated network with 50 nodes and 10 sources, in accordance with an embodiment of the present invention.
Figure 7:
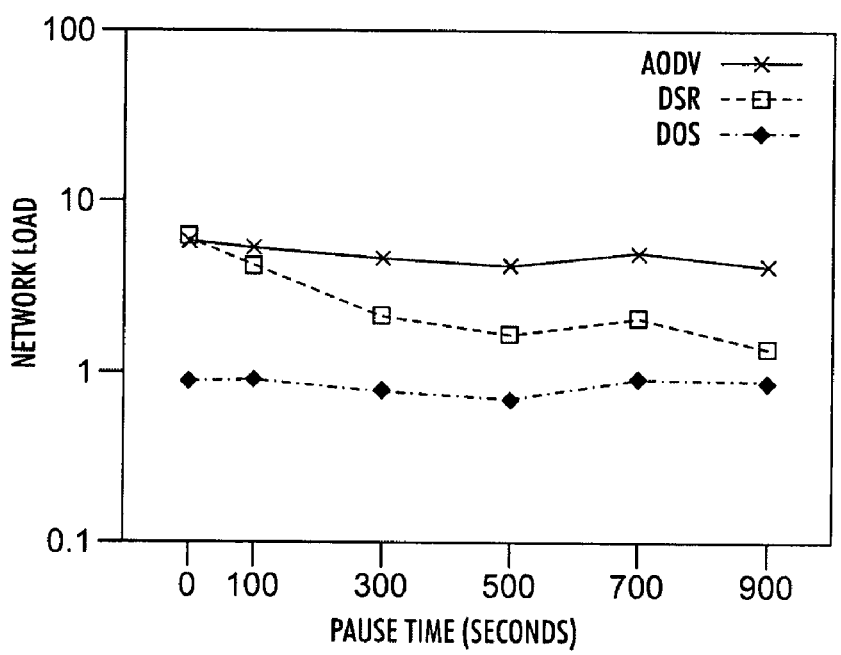
FIG. 7 compares the network load of DOS with those of AODV and DSR in a simulated network with 50 nodes and 30 sources, in accordance with an embodiment of the present invention.
Figure 12:
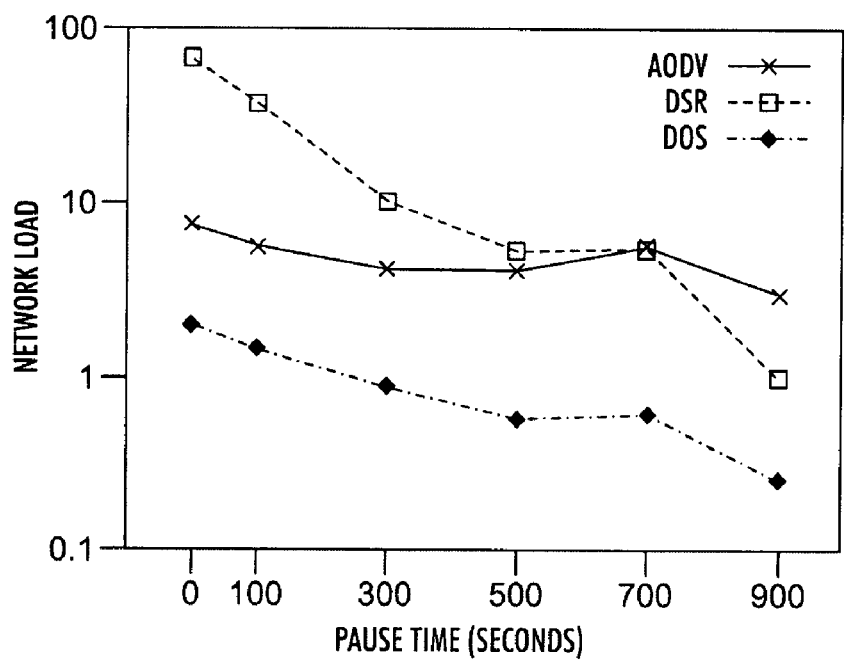
FIG. 12 compares the network load of DOS with those of AODV and DSR in a simulated network with 100 nodes and 10 sources, in accordance with an embodiment of the present invention.
Figure 13:
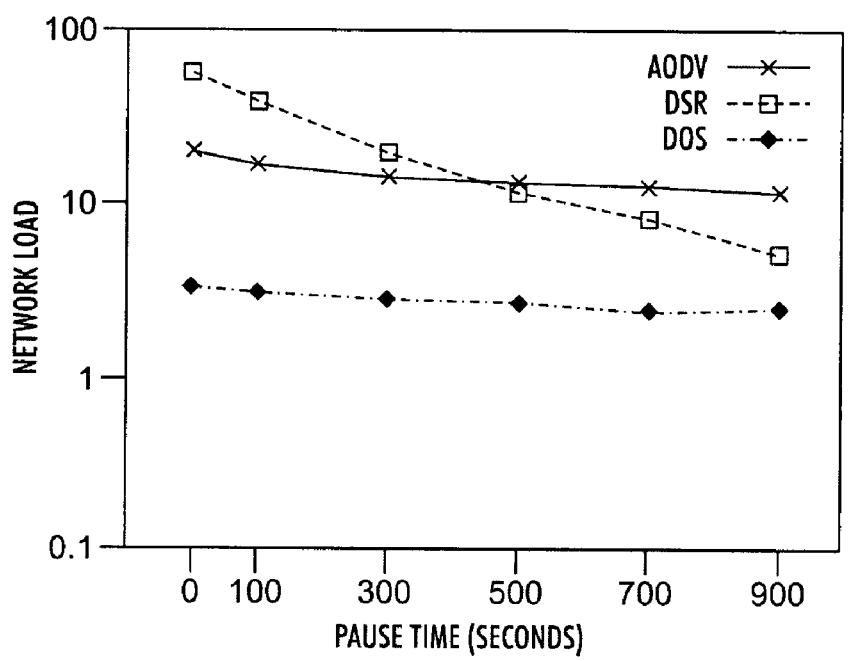
FIG. 13 compares the network load of DOS with those of AODV and DSR in a simulated network with 100 nodes and 30 sources, in accordance with an embodiment of the present invention.

FIGS. 6, 7, 12, and 13 show the network load comparison. As is shown in FIG. 6, at low load, DSR and AODV have substantially equivalent network loads. DOS has a lower load at high mobility (300 s and lower pause time), and ties with DSR at lower mobility (500 s and above pause time). With a medium load of 50 nodes and 30 sources, as is shown in FIG. 7, DOS has approximately $\frac{1}{2}$ to $\frac{1}{5}$ the load of DSR. DOS also has consistently about $\frac{1}{6}$ the load of AODV at all mobility. With a medium load of 100 nodes and 10 sources, as is shown in FIG. 12, DOS has approximately $\frac{1}{2}$ to $\frac{1}{10}$ the load of AODV, and about $\frac{1}{10}$ to $\frac{1}{40}$ the load of DSR. At high load, as is shown in FIG. 13, DOS has about $\frac{1}{6}$ the load of AODV over all mobility ranges, and about $\frac{1}{2}$ to $\frac{1}{20}$ the load of DSR.

Figure 8:
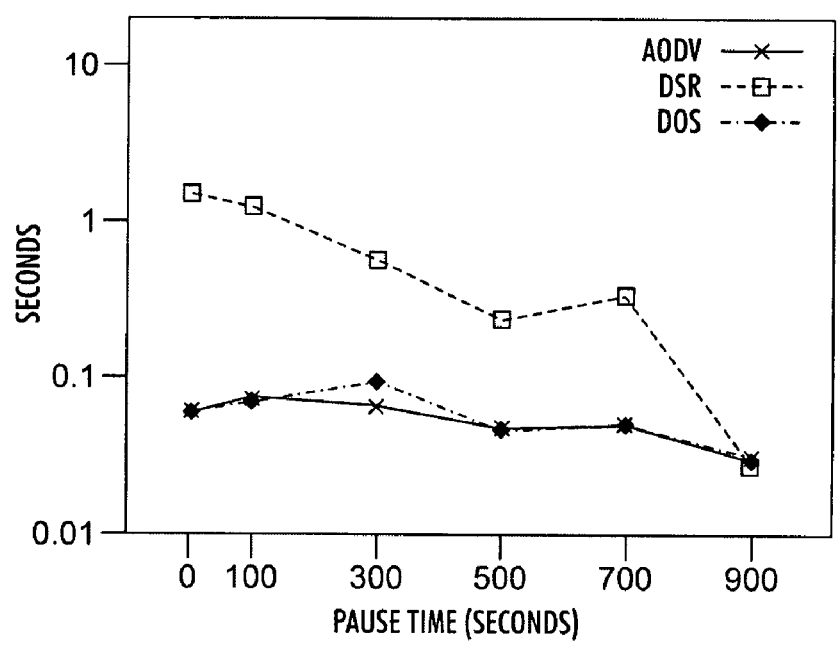
FIG. 8 compares the end-to-end latency of DOS with those of AODV and DSR in a simulated network with 50 nodes and 10 sources, in accordance with one embodiment of the present invention.
Figure 9:
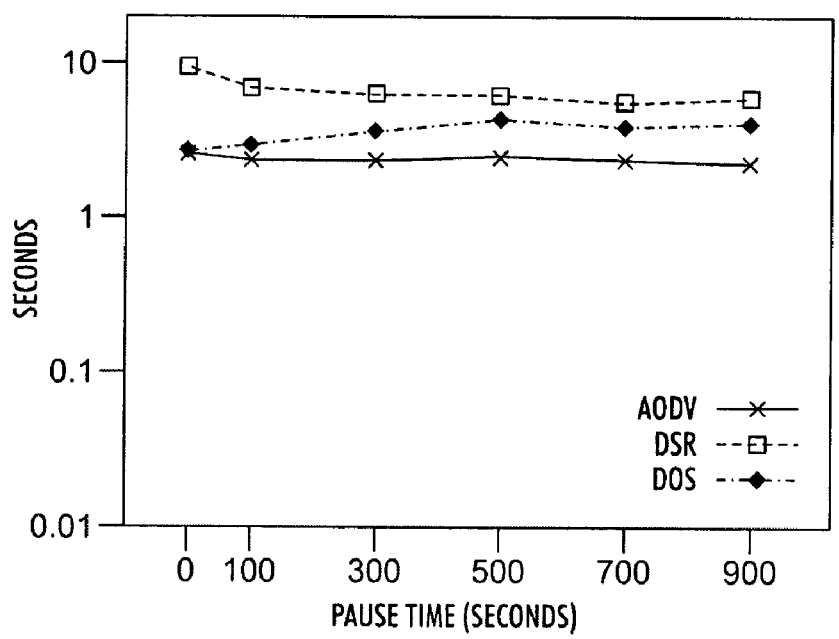
FIG. 9 compares the end-to-end latency of DOS with those of AODV and DSR in a simulated network with 50 nodes and 30 sources, in accordance with one embodiment of the present invention.
Figure 14:
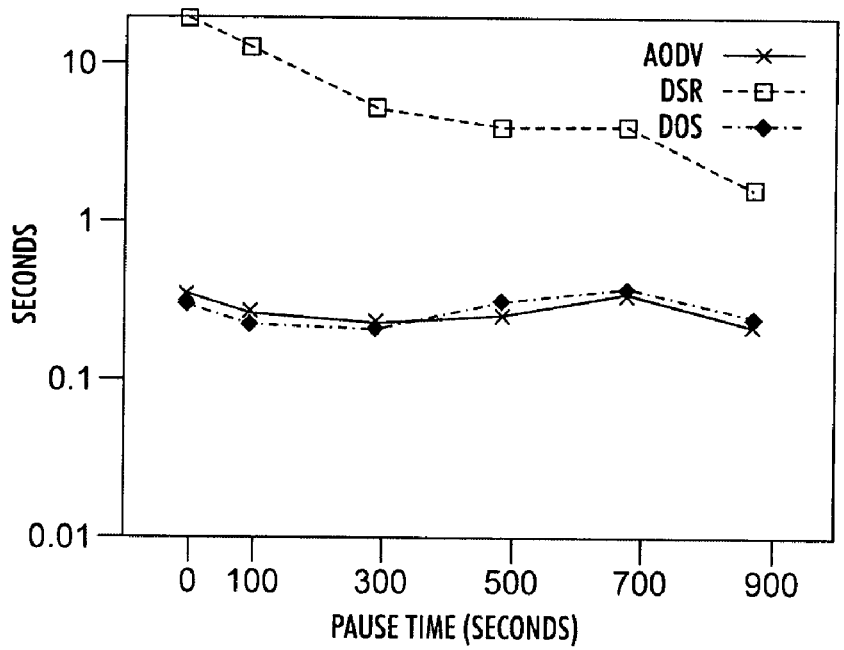
FIG. 14 compares the end-to-end latency of DOS with those of AODV and DSR in a simulated network with 100 nodes and 10 sources, in accordance with one embodiment of the present invention.
Figure 15:
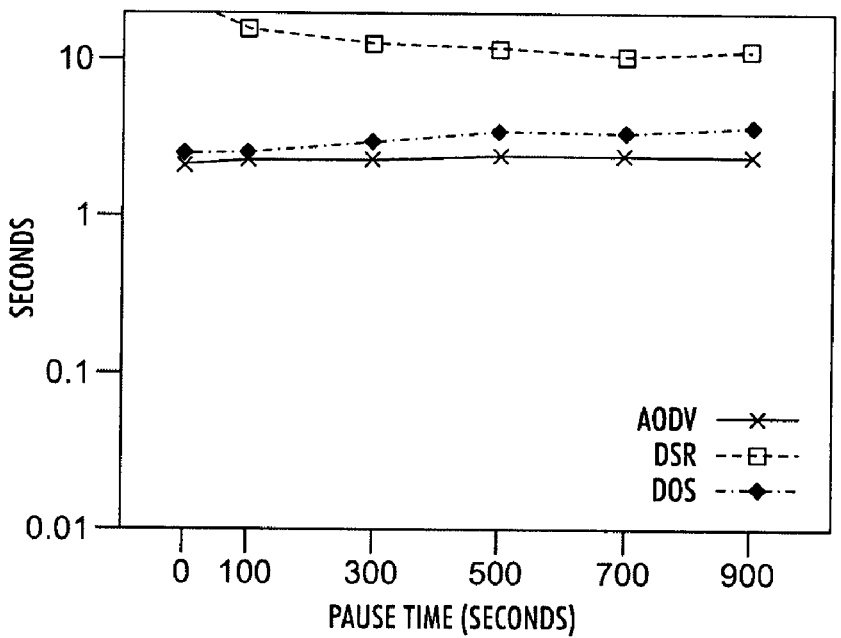
FIG. 15 compares the end-to-end latency of DOS with those of AODV and DSR in a simulated network with 100 nodes and 30 sources, in accordance with one embodiment of the present invention.
Figure 16:
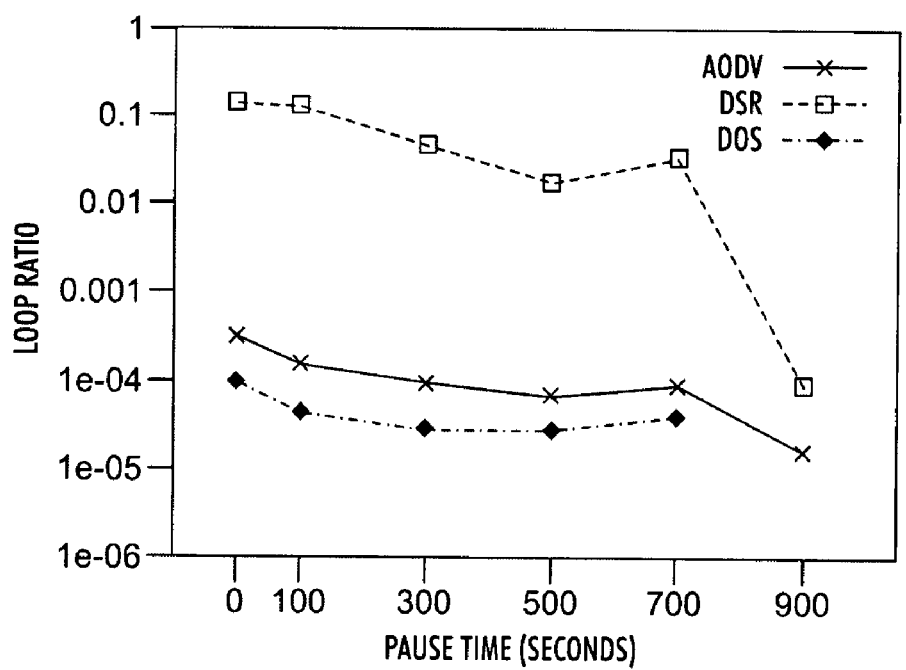
FIG. 16 compares the loop ratio of DOS with those of AODV and DSR in a simulated network with 50 nodes and 10 sources, in accordance with one embodiment of the present invention.
Figure 17:
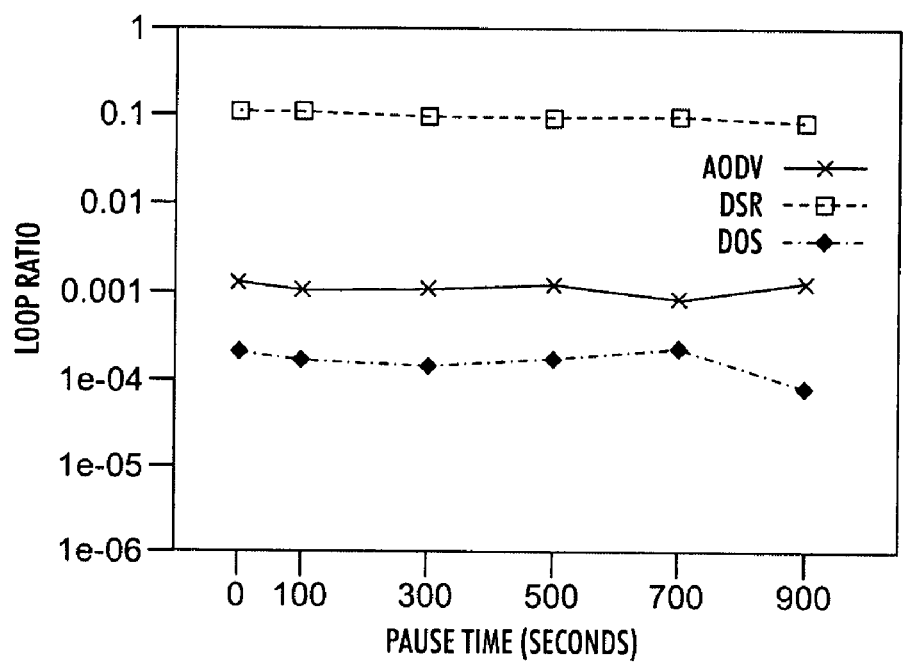
FIG. 17 compares the loop ratio of DOS with those of AODV and DSR in a simulated network with 50 nodes and 30 sources, in accordance with one embodiment of the present invention.
Figure 18:
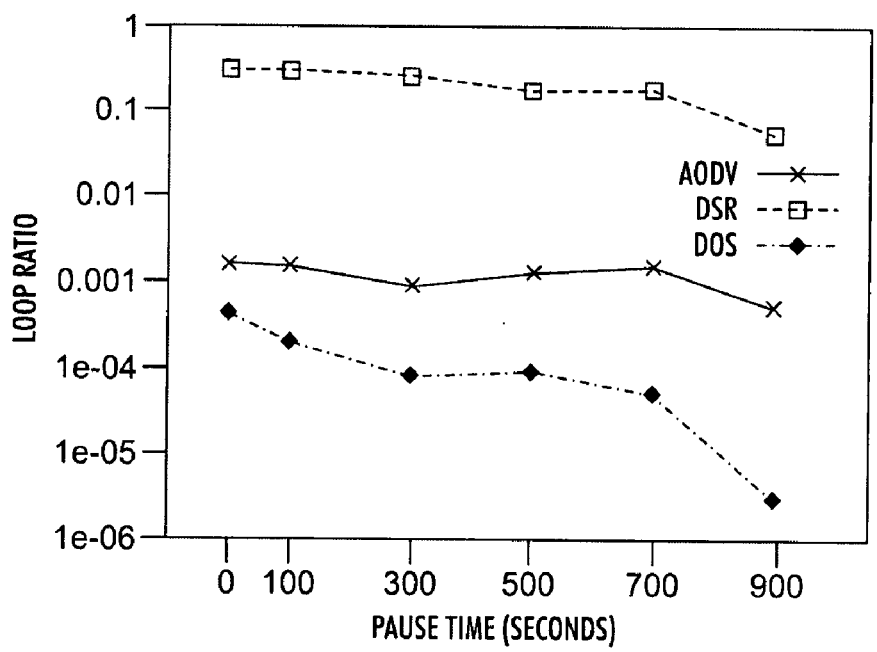
FIG. 18 compares the loop ratio of DOS with those of AODV and DSR in a simulated network with 100 nodes and 10 sources, in accordance with one embodiment of the present invention.
Figure 19:
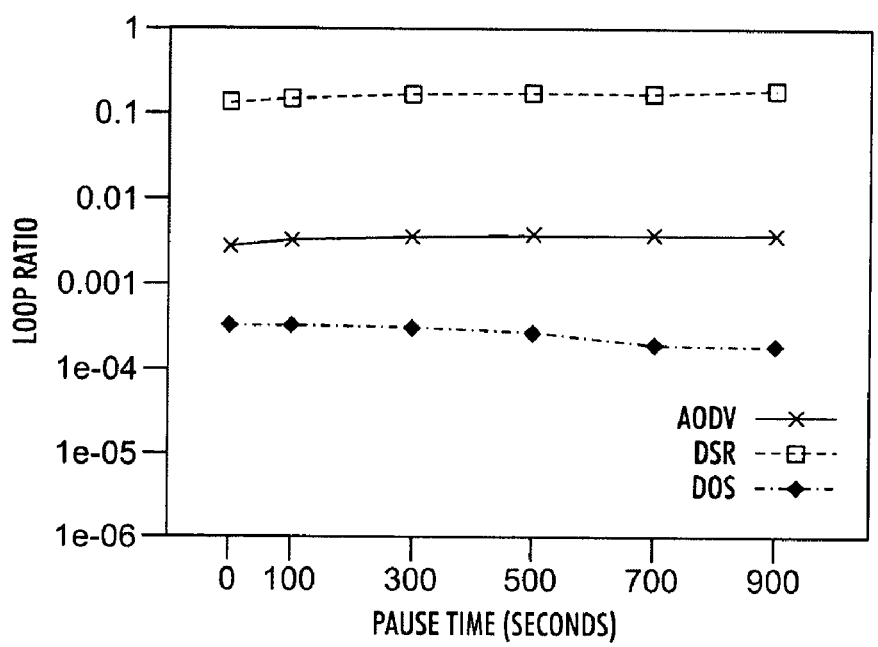
FIG. 19 compares the loop ratio of DOS with those of AODV and DSR in a simulated network with 100 nodes and 30 sources, in accordance with one embodiment of the present invention.

FIGS. 8, 9, 14, and 15 show the end-to-end latency comparison. In the 10-source scenarios, as is shown in FIGS. 8 and 14, DOS and AODV exhibit substantially equivalent latency. With mobility, DOS exhibits about $\frac{1}{2}$ to $\frac{1}{10}$ the latency of DSR. Without mobility (900 s pause time), DSR exhibits substantially the same latency. In the 30-source scenarios, as is shown in FIGS. 9 and 15, DOS and AODV have similar latency with high mobility. However, as the pause time increases, DOS exhibits approximately twice the latency of AODV. On the other hand, DOS exhibits about ½ to ¹/₁₀ the latency of DSR over all mobility patterns.

FIGS. 16-19 show the loop ratio comparison. With a few exceptions, DSR exhibits a loop ratio of approximately 0.1, indicating that on average one in ten packets loops through a single node once. In a few cases, the DSR loop ratio is close to 0.2 and in some other cases the ratio is down to 0.05. In one specific case in FIG. 16 where the pause time is 900 s, the loop ratio for DSR is approximately $10^{-4}$. The loop ratio for AODV is generally around $10^{-3}$, though in one case in FIG. 16 where the pause time is 900 s, the loop ratio for AODV drops to the order of $10^{-5}$. The loop ratio for DOS is generally around $10^{-4}$, though in one case in FIG. 16 where the pause time is 900 s, the loop ratio is exactly zero.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating loop-free ad-hoc routing in a wireless network, the method comprising:
    advertising a local integer sequence number associated with a local node for a destination node;
    receiving a first route request at the local node, wherein the route request specifies a source node, the destination node, and a first integer sequence number;
    selectively maintaining a record at the local node, wherein the record indicates the source node, the destination node, the first sequence number, and a node from which the route request is received; and
    selectively forwarding a second route request based on the received route request, wherein the second route request specifies the source node, the destination node, and a second integer sequence number which is less than the first sequence number and less than or equal to the advertised local sequence number.

2. The method of claim 1, wherein selectively maintaining the record at the local node involves:
    determining whether the local node has previously received the first route request; and
    if not, producing the record.

3. The method of claim 1, wherein the first route request includes a first time-to-live (TTL) value; and wherein the method further comprises:
    producing a second TTL value by reducing the first TTL value;
    determining whether the second TTL value is below a threshold; and
    if not, including the second TTL value in the second route request.

4. The method of claim 1, wherein selectively forwarding the second route request involves:
    setting the second sequence number to be the lesser value of:
        the advertised local sequence number, and
        the first sequence number reduced by a spacing interval.

5. The method of claim 1, further comprising:
    determining a sequence number which is greater than any sequence number advertised by a successor node for the destination node with respect to the local node and which less than the first sequence number specified by the first route request; and
    selectively sending a route reply to the node that sends the first route request, wherein the route reply specifies the determined sequence number.

6. The method of claim 1, further comprising:
    initiating a route request for the destination node at the local node, comprising:
        including the advertised local sequence number in the initiated route request;
        including a TTL value in the initiated route request; and
        broadcasting the initiated route request to one or more neighbor nodes.

7. The method of claim 1, further comprising:
    receiving a first route reply for the destination node, wherein the received route reply specifies a third integer sequence number associated with a node which sends the route reply; and
    selectively forwarding a second route reply, based on the first route reply, to a node which sends the first route request, wherein the second route reply contains a sequence number that is greater than the third sequence number.

8. The method of claim 7, wherein the first route reply is allowed to include characteristic information about a path for the destination node, thereby facilitating selection of a preferred path to the destination node; and
    wherein the method further comprises cryptically authenticating, encrypting, or decrypting a routing control message, which can be a routing request or a routing reply.

9. The method of claim 1, wherein the local node is identified by an Internet Protocol (IP) address, a locally assigned number, a locally assigned name, a Domain Naming System (DNS) name, an IP subnet address, or a link-layer Medium-Access Control (MAC) address.

10. A system for facilitating loop-free ad-hoc routing in a wireless network, the system comprising:
    an advertising mechanism configured to advertise a local integer sequence number associated with a local node for a destination node;
    a route-request receiving mechanism configured to receive a first route request at the local node, wherein the route request specifies a source node, the destination node, and a first integer sequence number;
    a storage mechanism configured to selectively maintain a record at the local node, wherein the record indicates the source node, the destination node, the first sequence number, and a node from which the route request is received; and
    a forwarding mechanism configured to selectively forward a second route request based on the received route request, wherein the second route request specifies the source node, the destination node, and a second integer sequence number which is less than the first sequence number and less than or equal to the advertised local sequence number.

11. The system of claim 10, wherein while selectively maintaining the record at the local node, the storage mechanism is configured to:
    determine whether the local node has previously received the first route request; and
    if not, to produce the record.

12. The system of claim 10, wherein the first route request includes a first time-to-live (TTL) value; and wherein the system further comprises:
    a TTL computation mechanism configured to:
        produce a second TTL value by reducing the first TTL value;

determine whether the second TTL value is below a threshold; and to include the second TTL value in the second route request based on the determination.

13. The system of claim 10, wherein while selectively forwarding the second route request, the forwarding mechanism is configured to:

set the second sequence number to be the lesser value of:
the advertised local sequence number, and
the first sequence number reduced by a spacing interval.

14. The system of claim 10, further comprising a route-reply mechanism configured to:

determine a sequence number which is greater than any sequence number advertised by a successor node for the destination node with respect to the local node and which is less than the first sequence number specified by the first route request; and to selectively send a route reply to the node that sends the first route request, wherein the route reply specifies the determined sequence number.

15. The system of claim 10, further comprising a route-request initiation mechanism configured to:

initiate a route request for the destination node at the local node;
include the advertised local sequence number in the initiated route request;
include a TTL value in the initiated route request; and
to broadcast the initiated route request to one or more neighbor nodes.

16. The system of claim 10, further comprising:

a route-reply receiving mechanism configured to receive a first route reply for the destination node, wherein the received route reply specifies a third integer sequence number associated with a node which sends the route reply; and a route-reply forwarding mechanism configured to selectively forward a second route reply, based on the first route reply, to a node which sends the first route request, wherein the second route reply contains a sequence number that is greater than the third sequence number.

17. The system of claim 16, wherein the first route reply is allowed to include characteristic information about a path for the destination node, thereby facilitating selection of a preferred path to the destination node; and wherein the system further comprises a security mechanism configured to cryptically authenticate, encrypt, or decrypt a routing control message, which can be a routing request or a routing reply.

18. The system of claim 10, wherein the local node is identified by an IP address, a locally assigned number, a locally assigned name, a DNS name, an IP subnet address, or a link-layer MAC address.

19. A computer-readable storage medium storing instructions that when executed by a computer cause the computer to perform a method for facilitating loop-free ad-hoc routing in a wireless network, the method comprising:

advertising a local integer sequence number associated with a local node for a destination node;

receiving a first route request at the local node, wherein the route request specifies a source node, the destination node, and a first integer sequence number;

selectively maintaining a record at the local node, wherein the record indicates the source node, the destination node, the first sequence number, and a node from which the route request is received; and selectively forwarding a second route request based on the received route request, wherein the second route request specifies the source node, the destination node, and a second integer sequence number which is less than the first sequence number and less than or equal to the advertised local sequence number.

20. The computer-readable storage medium of claim 19, wherein selectively maintaining the record at the local node involves:

determining whether the local node has previously received the first route request; and
if so, producing the record.

21. The computer-readable storage medium of claim 19, wherein the first route request includes a first time-to-live (TTL) value; and wherein the method further comprises:

producing a second TTL value by reducing the first TTL value;
determining whether the second TTL value is below a threshold; and
if not, including the second TTL value in the second route request.

22. The computer-readable storage medium of claim 19, wherein selectively forwarding the second route request involves:

setting the second sequence number to be the lesser value of:
the advertised local sequence number, and
the first sequence number reduced by a spacing interval.

23. The computer-readable storage medium of claim 19, the method further comprising:

determining a sequence number which is greater than any sequence number advertised by a successor node for the destination node with respect to the local node and which less than the first sequence number specified by the first route request; and selectively sending a route reply to the node that sends the first route request, wherein the route reply specifies the determined sequence number.

24. The computer-readable storage medium of claim 19, the method further comprising:

initiating a route request for the destination node at the local node, comprising:
including the advertised local sequence number in the initiated route request;
including a TTL value in the initiated route request; and
broadcasting the initiated route request to one or more neighbor nodes.

25. The computer-readable storage medium of claim 19, the method further comprising:

receiving a first route reply for the destination node, wherein the received route reply specifies a third integer sequence number associated with a node which sends the route reply; and selectively forwarding a second route reply, based on the first route reply, to a node which sends the first route request, wherein the second route reply contains a sequence number that is greater than the third sequence number.

* * * * *